United States Patent
Li et al.

(10) Patent No.: US 11,853,080 B2
(45) Date of Patent: Dec. 26, 2023

(54) SPRAY OPERATION METHOD AND DEVICE FOR UNMANNED AERIAL VEHICLE

(71) Applicant: SZ DJI TECHNOLOGY CO., LTD., Shenzhen (CN)

(72) Inventors: Jinsong Li, Shenzhen (CN); Guang Yan, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 258 days.

(21) Appl. No.: 17/337,407

(22) Filed: Jun. 2, 2021

(65) Prior Publication Data
US 2021/0286378 A1 Sep. 16, 2021

Related U.S. Application Data

(63) Continuation of application No. PCT/CN2018/119241, filed on Dec. 4, 2018.

(51) Int. Cl.
*G05D 1/04* (2006.01)
*G05D 1/10* (2006.01)
(Continued)

(52) U.S. Cl.
CPC ........... *G05D 1/042* (2013.01); *B64C 39/024* (2013.01); *B64D 1/18* (2013.01); *G05D 1/101* (2013.01);
(Continued)

(58) Field of Classification Search
CPC ............ G05D 1/042; G05D 1/101; G05D 2201/0201; B64C 39/024; B64D 1/18; G06T 19/003; G06T 2207/10032; G06T 2207/20084; G06T 2207/30188; G06V 20/188; G06V 10/82; G06V 20/17; A01C 7/085; B64U 2101/00; B64U 2201/10; A01M 7/0089
See application file for complete search history.

(56) References Cited

U.S. PATENT DOCUMENTS 9,592,912 B1 3/2017 Michini et al.
2018/0314268 A1* 11/2018 Tan ...................... B64C 39/024
(Continued)

FOREIGN PATENT DOCUMENTS

CN 104808660 A 7/2015
CN 105116911 A 12/2015
(Continued)

OTHER PUBLICATIONS

The World Intellectual Property Organization (WIPO) International Search Report for PCT/CN2018/119241 dated Aug. 28, 2019 6 pages.

*Primary Examiner* — Abby Y Lin
*Assistant Examiner* — Dylan M Katz
(74) *Attorney, Agent, or Firm* — ANOVA LAW GROUP, PLLC

(57) ABSTRACT

A spray operation method includes obtaining two-dimensional position information of a target area and a three-dimensional model of the target area, and obtaining an operation route according to the two-dimensional position information and the three-dimensional model, where the operation route includes a plurality of waypoints, and at least one of the waypoints is associated with altitude information.

16 Claims, 12 Drawing Sheets

(51) Int. Cl.
*B64C 39/02* (2023.01)
*B64D 1/18* (2006.01)
*G06T 19/00* (2011.01)
*G06V 20/10* (2022.01)
*A01C 7/08* (2006.01)
*B64U 101/00* (2023.01)

(52) U.S. Cl.
CPC .......... *G06T 19/003* (2013.01); *G06V 20/188* (2022.01); *A01C 7/085* (2013.01); *B64U 2101/00* (2023.01); *G05D 2201/0201* (2013.01); *G06T 2207/10032* (2013.01); *G06T 2207/20084* (2013.01); *G06T 2207/30188* (2013.01)

(56) References Cited

U.S. PATENT DOCUMENTS

2019/0318633 A1* 10/2019 Huang ................. G08G 5/0069
2020/0029490 A1* 1/2020 Bertucci ................ G06V 20/58

FOREIGN PATENT DOCUMENTS

| CN | 105159319 A |   | 12/2015 |
|----|-------------|---|---------|
| CN | 107544548 A | * | 1/2018  |
| CN | 107544548 A |   | 1/2018  |
| CN | 107728642 A |   | 2/2018  |
| CN | 108519775 A |   | 9/2018  |
| CN | 108684282 A |   | 10/2018 |
| KR | 20160082773 A |   | 7/2016 |

* cited by examiner

SPRAY OPERATION METHOD AND DEVICE FOR UNMANNED AERIAL VEHICLE

CROSS-REFERENCE TO RELATED APPLICATION

This application is a continuation of International Application No. PCT/CN2018/119241, filed Dec. 4, 2018, the entire content of which is incorporated herein by reference.

TECHNICAL FIELD

The present disclosure relates to the technical field of unmanned aerial vehicle and, more particularly, to a spray operation method and device of an unmanned aerial vehicle.

BACKGROUND

Agricultural unmanned aerial vehicles have been widely used in the field of agricultural plant protection due to their advantages such as simple operation and high working efficiency. For example, the agricultural unmanned aerial vehicles can be used to complete operations such as pesticide spraying and seed sowing.

In traditional technologies, an operation area in a designated plane can be generated by a coverage path planning algorithm, which generates operation waypoints that can cover the entire operation area, so that the designated area can be covered and sprayed.

However, in the traditional technologies, route planning is performed based on the operation area in the plane, so that a planned route only has two-dimensional information, and the information contained is single, which affects the operation effect of the agricultural unmanned aerial vehicles.

SUMMARY

In accordance with the disclosure, there is provided a spray operation method including obtaining two-dimensional position information of a target area and a three-dimensional model of the target area, and obtaining an operation route according to the two-dimensional position information and the three-dimensional model, where the operation route includes a plurality of waypoints, and at least one of the waypoints is associated with altitude information.

Also in accordance with the disclosure, there is provided a spray operation device including a memory storing instructions and a processor. The processor is configured to execute the instructions to obtain two-dimensional position information of a target area and a three-dimensional model of the target area, and obtain an operation route according to the two-dimensional position information and the three-dimensional model, where the operation route includes a plurality of waypoints, and at least one of the waypoints is associated with altitude information.

Also in accordance with the disclosure, there is provided a spray operation device including a memory storing instructions and a processor. The processor is configured to execute the instructions to obtain two-dimensional position information of a target area and an image of the target area, determine a spray area in the target area according to the image, obtain an operation route that includes one or more spray points each configured to enable or disable a spray operation according to the two-dimensional position information and the spray area, and control an unmanned aerial vehicle to perform the spray operation according to the operation route.

BRIEF DESCRIPTION OF THE DRAWINGS

In order to explain the embodiments of the present disclosure more clearly, reference is made to the accompanying drawings, which are used in the description of the embodiments or the existing technology. Obviously, the drawings in the following description are some embodiments of the present disclosure, and other drawings can be obtained from these drawings without any inventive effort for those of ordinary skill in the art.

DETAILED DESCRIPTION OF THE EMBODIMENTS

In order to make the objectives, technical solutions, and advantages of the embodiments of the present disclosure clearer, the technical solutions in the embodiments of the present disclosure will be described in detail with reference to the accompanying drawings. Obviously, the described embodiments are some of rather than all the embodiments of the present disclosure. Based on the described embodiments, all other embodiments obtained by those of ordinary skill in the art without inventive effort shall fall within the scope of the present disclosure.

Figure 1:
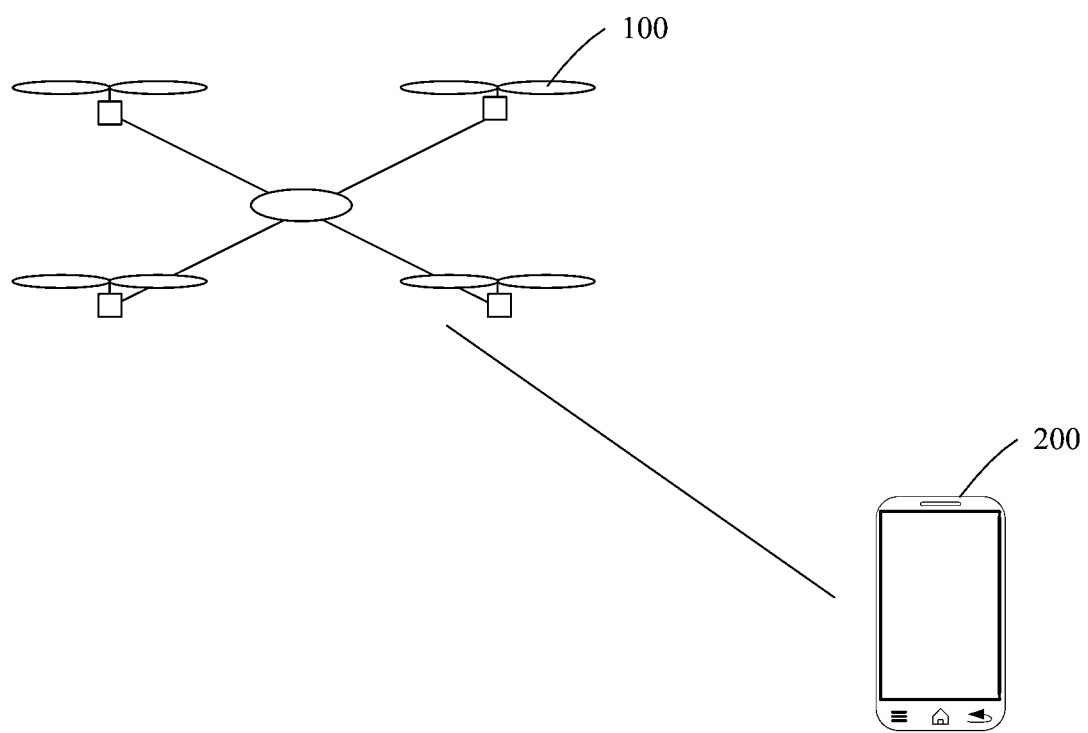
FIG. 1 is an architecture diagram of an unmanned aerial vehicle system to which the present disclosure is applicable.

FIG. 1 is an architecture diagram of an unmanned aerial vehicle system to which the present disclosure is applicable. As shown in FIG. 1, the unmanned aerial vehicle system includes an unmanned aerial vehicle 100 and a control device 200. There may be communication between the unmanned aerial vehicle 100 and the control device 200 to transmit data and/or instructions. For example, the unmanned aerial vehicle 100 may be an agricultural unmanned aerial vehicle 100 configured to perform a spray operation. When performing the spray operation, the unmanned aerial vehicle 100 can receive the data and/or instructions sent by the control device 200, and complete the spray operation according to the received data and/or instructions.

It should be noted that the present disclosure does not limit the structure and model of the unmanned aerial vehicle 100. For example, a camera device may be provided at the unmanned aerial vehicle 100.

It should be noted that the present disclosure does not limit the implementation manner of the control device 200. For example, the control device 200 may be a computer, a smart phone, a tablet computer, etc. For example, a software program can be pre-installed at the control device 200 to realize data processing related to the spray operation. For example, the control device 200 may include a display screen or be connected to an external display device, so as to display data related to the spray operation of the unmanned aerial vehicle 100.

Figure 2:
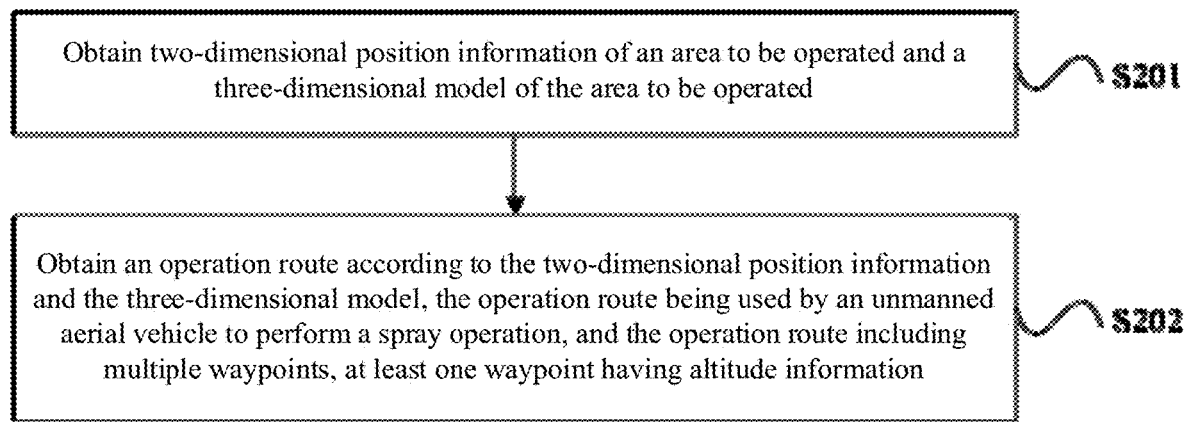
FIG. 2 is a flow chart of an example spray operation method of an unmanned aerial vehicle consistent with the present disclosure.

FIG. 2 is a flow chart of an example spray operation method of an unmanned aerial vehicle consistent with the present disclosure. In the spray operation method of the unmanned aerial vehicle consistent with the present disclosure, the execution subject may be a spray operation device of the unmanned aerial vehicle. As shown in FIG. 2, the spray operation method of the unmanned aerial vehicle consistent with the present disclosure includes the following processes.

S201, obtaining two-dimensional position information of an area to be operated and a three-dimensional model of the area to be operated.

The two-dimensional position information of the area to be operated, also referred to as a "target area," is used to identify a plan coverage of the area to be operated. The present disclosure does not limit the implementation manner of the two-dimensional position information.

The two-dimensional position information is described below with an example. It is assumed that the area to be operated is a quadrilateral.

For example, in an implementation manner, the two-dimensional position information of the area to be operated may include two-dimensional coordinates of vertices of the area to be operated. In this example, it specifically includes the two-dimensional coordinates of four vertices of the quadrilateral.

For example, in another implementation manner, the two-dimensional position information of the area to be operated may include two-dimensional information of boundary lines of the area to be operated. In this example, it specifically includes the two-dimensional information of four sides of the quadrilateral.

The three-dimensional model of the area to be operated refers to a model with three-dimensional position information established for the area to be operated in a three-dimensional coordinate system. From the three-dimensional model, altitude of each point in the model can be obtained. For example, altitude information of a flat ground, a hillside, and even a tree on the hillside in the area to be operated can all be known. For example, the three-dimensional model of the area to be operated may also include information of other dimensions, such as color information, etc.

It should be noted that the present disclosure does not limit the obtaining manner of the three-dimensional model of the area to be operated. Photogrammetry and three-dimensional reconstruction techniques are described below.

First, the photogrammetry technique is used to cover and capture multiple photos of a terrain from multiple angles, and record shooting poses and Global Positioning System (GPS) information. For example, a surveying and mapping aerial vehicle such as a P4r is used. Then, the three-dimensional model of the terrain can be restored by using the three-dimensional reconstruction technique such as structure from motion (SFM).

S202, obtaining an operation route according to the two-dimensional position information and the three-dimensional model, the operation route being used by the unmanned aerial vehicle to perform a spray operation, and the operation route including multiple waypoints, at least one waypoint having altitude information.

Specifically, according to the two-dimensional position information that can identify the plane coverage of the area to be operated and the three-dimensional model with altitude information, an obtained operation route may have the altitude information. The operation route includes multiple waypoints, and at least one of the waypoints has the altitude information. The unmanned aerial vehicle can control flight altitude according to the operation route with the altitude information. The flight altitude of the unmanned aerial vehicle is increased where the terrain is high, which improves safety of the spray operation of the unmanned aerial vehicle. The flight altitude of the unmanned aerial vehicle is reduced where the terrain is low, which allows the unmanned aerial vehicle to be closer to the object to be sprayed, and improves spray effect of the spray operation of the unmanned aerial vehicle.

The operation route and waypoints are described below with an example.

Figure 3A:
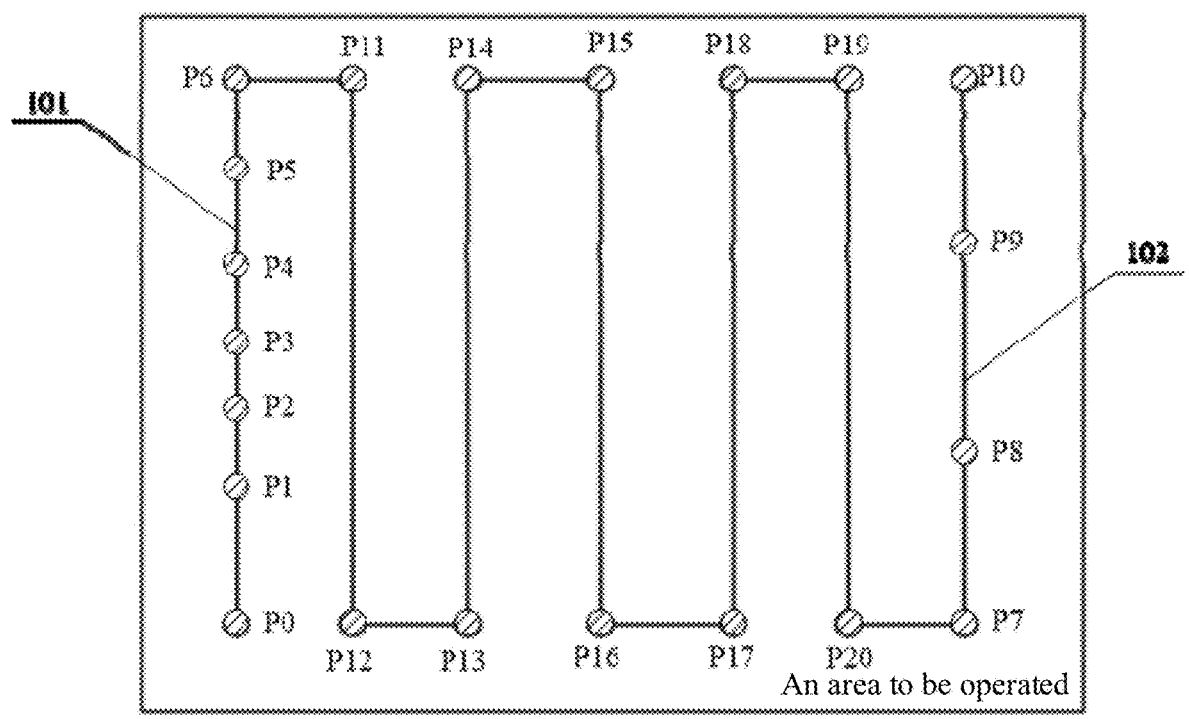
FIG. 3A is a schematic diagram showing an example of an operation route according to an example embodiment of the present disclosure.
Figure 3B:
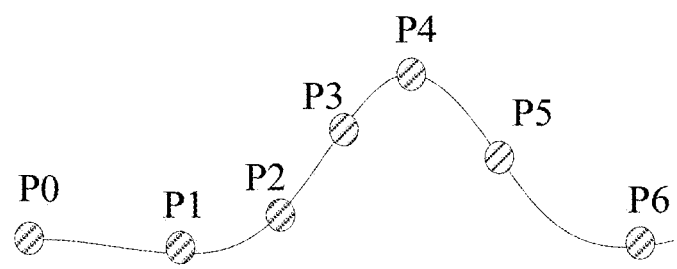
FIG. 3B is a schematic diagram showing a terrain corresponding to operation route 101 in FIG. 3A.
Figure 3C:
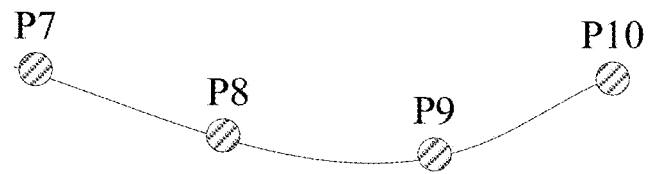
FIG. 3C is a schematic diagram showing a terrain corresponding to operation route 102 in FIG. 3A.

Referring to FIGS. 3A-3C, FIG. 3A is a schematic diagram showing an example of an operation route according to an example embodiment of the present disclosure, FIG. 3B is a schematic diagram showing a terrain corresponding to operation route 101 in FIG. 3A, and FIG. 3C is a schematic diagram showing a terrain corresponding to operation route 102 in FIG. 3A.

As shown in FIG. 3A, P0 to P10 represent waypoints. An operation route 101 is defined between P0 and P6. Another operation route 102 is defined between P7 and P10. It should be noted that the present disclosure does not limit the definition of the operation route. According to the definitions of operation routes 101 and 102, there are a total of 7 operation routes in the area to be operated shown in FIG. 3A. For example, in some application scenarios, only one operation route may be defined between P0 and P10.

As shown in FIGS. 3A and 3B, the operation route 101 includes waypoints P0 to P6. The terrain corresponding to the operation route 101 is a structure protruding upward in the middle. The waypoints P0 to P6 may all include altitude information. As such, from the altitude information of the waypoints P0 to P6, the unmanned aerial vehicle can be controlled to increase the flight altitude in the protruding area in the middle.

As shown in FIGS. 3A and 3C, the operation route 102 includes waypoints P7 to P10. The terrain corresponding to the operation route 102 is a structure recessed downward in the middle. The waypoints P7, P9 to P10 may include altitude information, and the waypoint P8 may not include altitude information. As such, from the altitude information of the waypoints P7, P9 to P10, the unmanned aerial vehicle can fly with reduced altitude in the recessed area in the middle.

Therefore, in the spray operation method of the unmanned aerial vehicle consistent with the present disclosure, the operation route with the altitude information can be obtained according to the two-dimensional position information and the three-dimensional model of the area to be operated.

Thus, the unmanned aerial vehicle performs the spray operation according to the operation route with the altitude information, increasing the flight altitude where the terrain is high, and reducing the flight altitude where the terrain is low. Compared with existing technologies, in which the route only has two-dimensional information, the spray operation method of the unmanned aerial vehicle consistent with the present disclosure improves the safety and spray effect of the unmanned aerial vehicle during the spray operation.

For example, in S202, the spray operation of the unmanned aerial vehicle may include obtaining a preset distance value or a distance value input by a user, and controlling the unmanned aerial vehicle to perform the spray operation according to the preset distance value or the distance value input by the user, as well as the operation route, to achieve a ground-like flight.

The ground-like flight means that the flight operation altitude of the unmanned aerial vehicle changes with fluctuation of the ground. The unmanned aerial vehicle keeps a certain distance from ground altitude all the time. It should be noted that when there is an object on the ground, for example, an obstacle, a crop to be sprayed, a fruit tree, etc., the ground altitude includes altitude of the object.

Since the operation route has the altitude information, the unmanned aerial vehicle can be controlled to realize the ground-like flight according to the operation route. The altitude between the unmanned aerial vehicle and the ground can be the preset distance value or the distance value input by the user.

It should be noted that the present disclosure does not limit the specific value of the preset distance value or the distance value input by the user.

For example, in S202, obtaining the operation route according to the two-dimensional position information and the three-dimensional model may include determining multiple planned routes according to the two-dimensional position information, and determining key points on each planned route according to the three-dimensional model to obtain the operation route. The key points have the altitude information, and the waypoints include the key points.

In the present disclosure, a route determined according to the two-dimensional position information is referred to as a planned route. A route determined according to the two-dimensional position information and the three-dimensional model is referred to as an operation route. The planned route only has two-dimensional information, while the operation route also has the altitude information in addition to the two-dimensional information. The operation route is obtained based on the planned route. Specifically, the key points on each planned route are determined according to the three-dimensional model, and the key points have the altitude information. Finally, the waypoints included on the operation route include the key points.

It should be noted that the definition of a planned route is the same as the definition of an operation route in the present disclosure.

It should be noted that the present disclosure does not limit the implementation manner of how to determine the multiple planned routes according to the two-dimensional position information, and an existing path planning algorithm can be used.

The planned route, operation route, key points, and waypoints are described below with taking FIG. 3A as an example again. A full coverage path planning algorithm is used as the algorithm for determining the planned route.

As shown in FIG. 3A, for the area to be operated, a full coverage path planning algorithm is used to obtain a series of waypoint sequences, including P0, P6, P11~P20, P7, and P10. A planned route is determined between every two adjacent waypoints. A spray of the entire area to be operated can be completed after these waypoints are passed through in turn and switch actions on spray head are executed. For example, a planned route is defined between P0 and P6, and another planned route is defined between P11 and P12. The unmanned aerial vehicle turns on the spray head at point P0, the unmanned aerial vehicle turns off the spray head at point P6, the unmanned aerial vehicle turns on the spray head at point P11, the unmanned aerial vehicle turns off the spray head at P12, and so on, to complete the spray of the entire area to be operated. For the planned route determined by the waypoints P0 and P6, the key points on the planned route can be determined according to the three-dimensional model, such as P0 to P6 that already have the altitude information in this case. The operation route 101 obtained finally includes the waypoints P0 to P6, and P0 to P6 are also key points.

For example, determining the key points on each planned route according to the three-dimensional model may include inserting candidate points on the planned route according to a preset rule or obtaining candidate points input by the user for the planned route, and obtaining the altitude information of the candidate points according to the three-dimensional model to obtain the key points.

Specifically, in an implementation manner, candidate points are automatically inserted on the planned route according to a preset rule. In another implementation manner, candidate points manually inserted by the user on the planned route can be obtained. After that, the altitude information can be added to the candidate points according to the three-dimensional model to obtain the key points.

The difference between the candidate points and the key points is that a set of the candidate points includes a set of the key points. In other words, a set of the key points is a full set or a subset of a set of the candidate points.

It should be noted that the present disclosure does not limit the specific implementation manner of the preset rule. For example, the preset rule may include inserting the candidate points on the planned route according to a preset interval. For example, the preset rule may include inserting the candidate points on the planned route according to a preset flight time interval. In this case, the unmanned aerial vehicle has the same flight time between two adjacent candidate points.

For example, the spray operation method of the unmanned aerial vehicle consistent with the present disclosure may also include, before obtaining the key points, obtaining two adjacent candidate points, determining a slope between the two candidate points according to the altitude information of the two candidate points, deleting one of the candidate points if the absolute value of the slope is less than a first preset value, and continuing to perform operations on two adjacent candidate points.

Specifically, after the candidate points are inserted on the planned route, the candidate points can also be sorted, and unnecessary candidate points can be deleted. The candidate points that are finally retained are the key points. In this implementation manner, the slope between two points is calculated for two adjacent candidate points. If the absolute value of the slope is less than the first preset value, it indicates that the terrain change is relatively smooth and does not require too many candidate points, so any one of the candidate points can be deleted. If the absolute value of the slope is greater than or equal to the first preset value, it indicates that the terrain change is relatively steep, and the candidate points need to be retained as the key points. Then the next two adjacent candidate points are selected and the operation described above is repeated. It should be noted that the present disclosure does not limit the specific value of the first preset value.

By calculating the slope between two adjacent candidate points, unnecessary candidate points can be deleted, so that the number of points is reduced, and redundant altitude information is deleted, which is conducive to the spray operation of the unmanned aerial vehicle.

The following is the description with an example.

Figure 4:
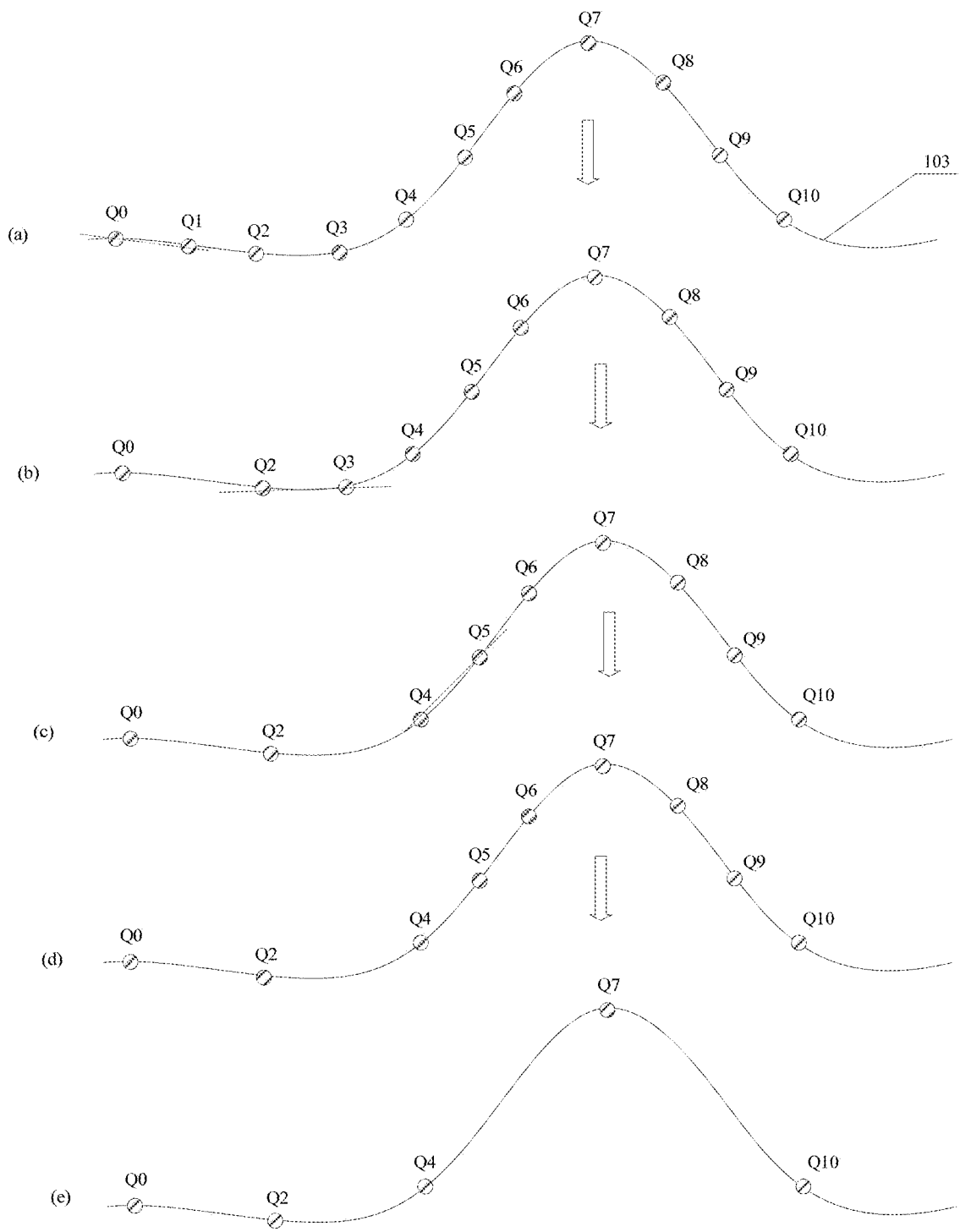
FIG. 4 is a schematic diagram showing deleting candidate points on a planned route according to an example embodiment of the present disclosure.

FIG. 4 is a schematic diagram showing deleting candidate points on a planned route according to an example embodiment of the present disclosure. As shown in FIG. 4, in state (a), a planned route 103 includes candidate points Q0 to Q10. First, candidate points Q0 and Q1 are selected. The absolute value of the slope between Q0 and Q1 is less than the first preset value, and Q1 is deleted. Then, referring to state (b), candidate points Q2 and Q3 are selected. The absolute value of the slope between Q2 and Q3 is less than the first preset value, and Q3 is deleted. Then, referring to state (c), candidate points Q4 and Q5 are selected. The absolute value of the slope between Q4 and Q5 is greater than the first preset value, and Q4 and Q5 are retained. Finally, referring to state (d), the key points include Q0, Q2, Q4 to Q10.

It should be noted that FIG. 4 is only an example of "continuing to perform operations on two adjacent candidate points". In this example, continuing to perform operations on two adjacent candidate points may include selecting two adjacent candidate points for which the slope has not been calculated after the candidate points for which the slope has been calculated according to the sequence of the candidate points, and continuing to perform operations of slope calculation and point deletion.

In another example, continuing to perform operations on two adjacent candidate points may include selecting the last candidate point from the candidate points for which the slope has been calculated and the first candidate point from the candidate points for which the slope has not been calculated according to the sequence of the candidate points, and continuing to perform operations of slope calculation and point deletion.

Take (a) in FIG. 4 as an example for description. First, Q0 and Q1 are selected. Since the absolute value of the slope between Q0 and Q1 is less than the first preset value, Q1 is deleted. Then, Q0 and Q2 are selected, and operations of slope calculation and point deletion are continued to perform, and so on.

For example, the spray operation method of the unmanned aerial vehicle consistent with the present disclosure may also include, before obtaining the key points, obtaining four adjacent candidate points to form two candidate point pairs, each candidate point pair including two adjacent candidate points, obtaining the slope between two candidate points in the two candidate point pairs respectively, deleting any two of the candidate points if the difference between the slopes of the two candidate points in the two candidate point pairs is less than a preset value, and continuing to perform operations on four adjacent candidate points.

By calculating the slope between two candidate point pairs, unnecessary candidate points can be deleted, so that the number of points is reduced, and redundant altitude information is deleted, which is conducive to the spray operation of the unmanned aerial vehicle.

Take Q4 to Q7 in state (d) of FIG. 4 as an example for description. The two candidate point pairs are Q4 and Q5, Q6 and Q7, respectively. Since the difference of the slope between Q4 and Q5 and the slope between Q6 and Q7 is less than the preset value, Q5 and Q6 are deleted. Similarly, for Q7 to Q10, Q8 and Q9 can be deleted. The key points finally obtained are shown in state (e) in FIG. 4.

It should be noted that the operations on four adjacent candidate points are continued to perform, where for the four adjacent candidate points, reference can be made to the definition of the two adjacent candidate points described above with similar principle, and will not be repeated herein.

For example, determining the key points on each planned route according to the three-dimensional model may include inputting the multiple planned routes and the three-dimensional model into a first neural network model to obtain the key points on each planned route.

In this implementation manner, the key points are obtained by a neural network algorithm, which improves the accuracy of obtaining the key points. The first neural network model is used to obtain the key points, and the present disclosure does not limit the training process and implementation manner of the first neural network model.

For example, the planned route includes operation points, which are used to enable or disable the spray operation.

The key points include the operation points, and the present disclosure does not limit the number and positions of the operation points.

For example, two end points of each planned route are two operation points, and the two operation points are used to enable and disable the spray operation respectively.

The operation points are described below with an example. As shown in FIGS. 4, P0, P6, P11 to P20, P7, and P10 can be operation points.

A spray operation method of an unmanned aerial vehicle consistent with the present disclosure includes obtaining two-dimensional position information of an area to be operated and a three-dimensional model of the area to be operated, and obtaining an operation route according to the two-dimensional position information and the three-dimensional model, the operation route being used by the unmanned aerial vehicle to perform the spray operation, and the operation route including multiple waypoints, at least one waypoint having altitude information.

In the spray operation method of the unmanned aerial vehicle consistent with the present disclosure, the operation route with altitude information can be obtained according to the two-dimensional position information and the three-dimensional model of the area to be operated. The unmanned aerial vehicle performs the spray operation according to the operation route with the altitude information, which improves the safety performance and spray effect of the spray operation of the unmanned aerial vehicle.

Figure 5:
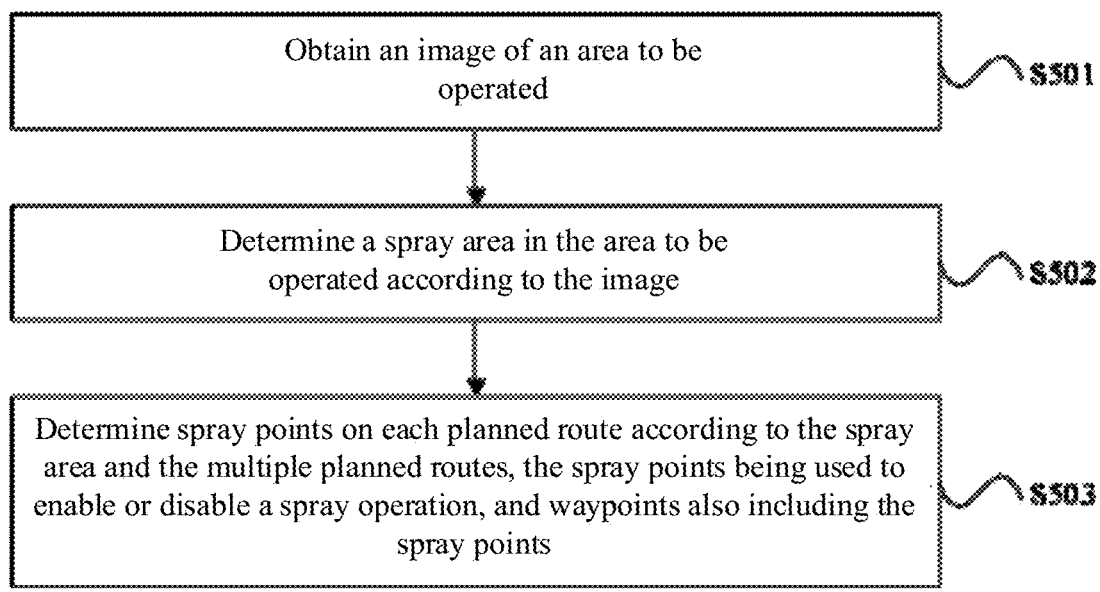
FIG. 5 is a flow chart of another example spray operation method of an unmanned aerial vehicle consistent with the present disclosure.

FIG. 5 is a flow chart of another example spray operation method of an unmanned aerial vehicle consistent with the present disclosure. The spray operation method of the unmanned aerial vehicle consistent with the present disclosure, on the basis of the example embodiment shown in FIGS. 2 to 4, provides another implementation manner of the spray operation method of the unmanned aerial vehicle. As shown in FIG. 5, according to the spray operation method of the unmanned aerial vehicle consistent with the present disclosure, obtaining an operation route (S202) also includes the following processes.

S501, obtaining an image of the area to be operated.

The image of the area to be operated can be a two-dimensional plane image or a three-dimensional image.

S502, determining a spray area in the area to be operated according to the image.

Specifically, for the entire area to be operated, such as a piece of farmland, it may include an obstacle, a water area, etc. that do not need to be sprayed. Therefore, the spray area in the area to be operated can be determined according to the image of the area to be operated.

S503, determining spray points on each planned route according to the spray area and the multiple planned routes, the spray points being used to enable or disable the spray operation, and the waypoints also including the spray points.

The spray area and spray points are described below with an example.

Figure 6:
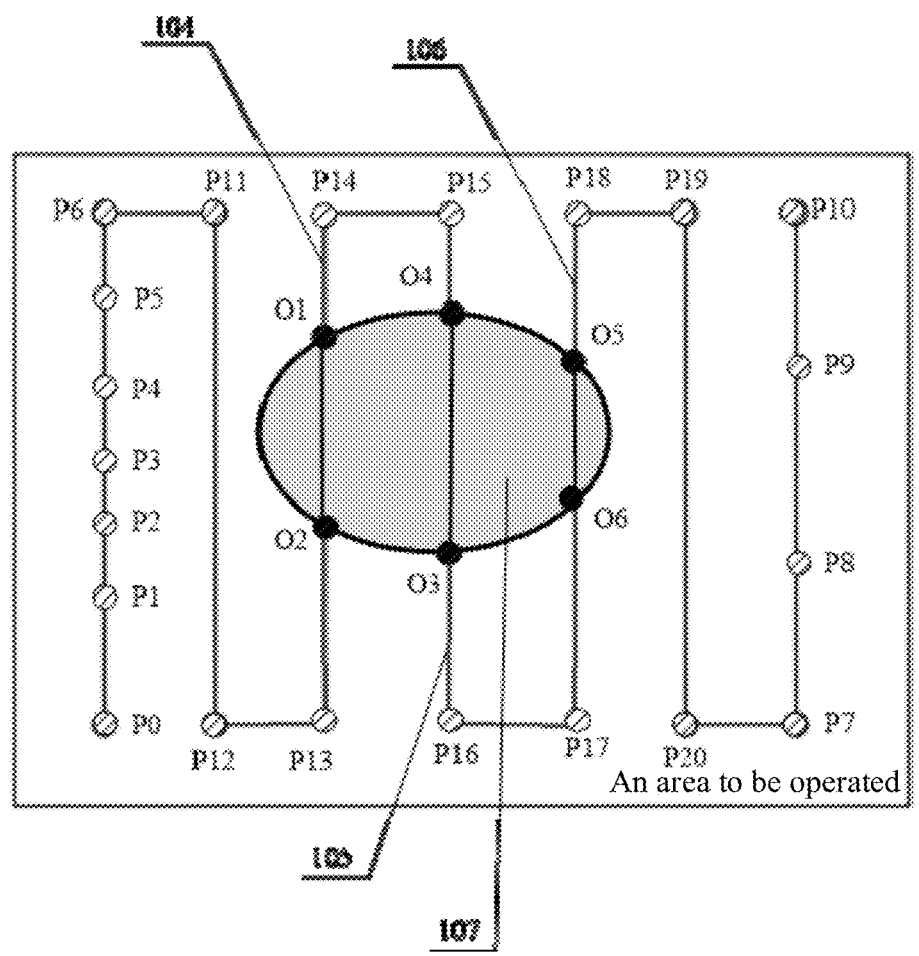
FIG. 6 is a schematic diagram of a spray area according to another example embodiment of the present disclosure.

FIG. 6 is a schematic diagram of a spray area according to an example embodiment of the present disclosure. As shown in FIG. 6, a spray area 107 can be determined according to the image of the area to be operated. For planned routes 104 to 106, they all pass through the spray area 107. According to the spray area 107 and the planned route 104, the spray points on the planned route 104 can be determined as O1 and O2, where O2 is used to enable the spray operation, and O1 is used to disable the spray operation. In this case, the operation of turning on or off the spray head may not need to be performed at the operation points P13 and P14. Similarly, according to the spray area 107 and the planned route 105, the spray points on the planned route 105 can be determined as O3 and O4. According to the spray area 107 and the planned route 106, the spray points on the planned route 106 can be determined as O5 and O6.

It should be noted that, in order to facilitate the comparison between FIG. 6 and FIG. 5, other information in FIG. 6 remains unchanged, and reference can be made to the description of FIG. 3A.

It should be noted that the present disclosure does not limit the number of spray areas.

Thus, according to the spray operation method of the unmanned aerial vehicle consistent with the present disclosure, on the basis that the operation route is provided with the altitude information according to three-dimensional model of the area to be operated, actual spray points on the planned route can also be determined according to the image of the area to be operated and different spray scenes. Therefore, the unmanned aerial vehicle can use the actual spray points to perform the spray operation according to actual spray scene. The spray head is turned on in the area that needs to be sprayed and is turned off in the area that does not need to be sprayed, which further improves the spray effect and the flexibility of spray head control during the spray operation of the unmanned aerial vehicle.

For example, S502, determining the spray area in the area to be operated on according to the image, may include inputting the image into a second neural network model to obtain the spray area, or inputting the image into a third neural network model to obtain classification information corresponding to each unit image, and obtaining the spray area according to the classification information corresponding to each unit image.

For example, in an implementation manner, the spray area in the area to be operated can be directly obtained from the second neural network model, which improves the accuracy of determining the spray area. In another implementation manner, classification information of different regions in the area to be operated is first obtained from the third neural network model. Then, the spray area can be determined according to whether the regions of different classifications need to be sprayed, which improves the flexibility of determining the spray area. For example, the classification information may include a crop, a fruit tree, a pool, a mountain, an obstacle, etc.

For example, S503, determining the spray points on each planned route according to the spray area and the multiple planned routes, may include obtaining intersections of the spray area and each planned route, and obtaining the spray points on each planned route according to the intersections.

It should be noted that the present disclosure does not limit the number of intersections on each planned route, which varies depending on shape of the spray area and direction of the planned route.

For example, in FIG. 6, the spray area 107 is a relatively regular ellipse. There are two intersections between the spray area 107 and the planned routes 104 to 106, which are then determined as the spray points.

For example, the spray points may have the altitude information. The spray operation method of the unmanned aerial vehicle consistent with the present disclosure may also include, for a point set composed of the key points and the spray points on each operation route, obtaining adjacent two points according to the sequence of the points on the operation route, the two points including at least one key point.

If the Euclidean distance between the two points is less than a second preset value, any one of the key points is deleted, and the operations on two adjacent points are continued to perform.

Since the spray points also have the altitude information, by deleting the spray points and the key points that are close to each other, unnecessary points with the altitude information can be deleted, so that the number of points is reduced, and redundant altitude information is deleted, which is conducive to the spray operation of the unmanned aerial vehicle.

In the operations continued to perform on two adjacent points, as for the definition of the two adjacent points, reference can be made to the description in the example shown in FIG. 4, which will not be repeated herein.

It should be noted that the present disclosure does not limit the specific value of the second preset value.

The following is the description with an example.

Figure 7:
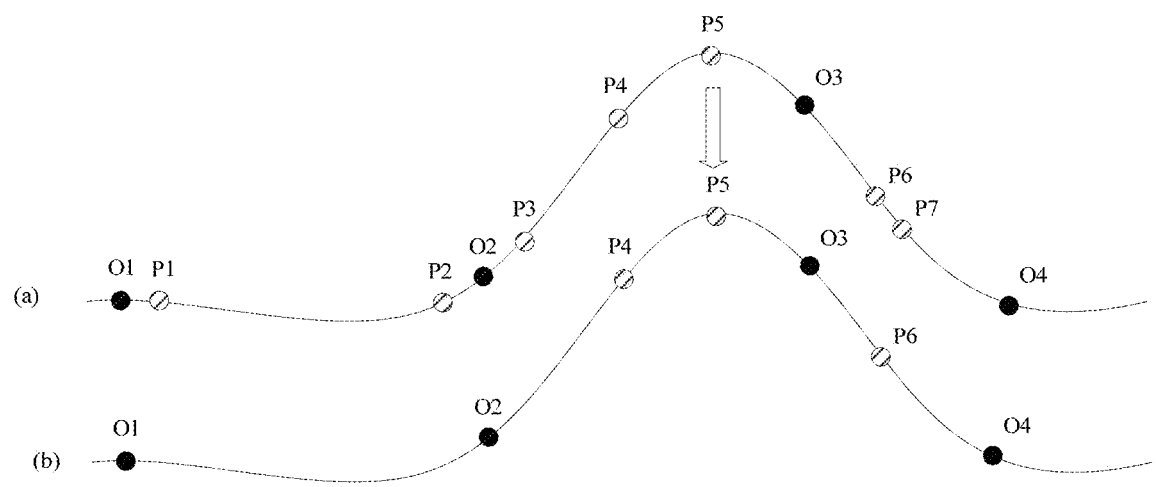
FIG. 7 is a schematic diagram showing a point deletion operation on a point sequence including key points and spray points according to another example embodiment of the present disclosure.

FIG. 7 is a schematic diagram showing performance of a point deletion operation on a point sequence composed of key points and spray points according to an example embodiment of the present disclosure. As shown in state (a) in FIG. 7, the key points are P1 to P7, and the spray points are O1 to O4. For the spray point O1 and the key point P1, since the Euclidean distance between O1 and P1 is less than the second preset value, the key point P1 is deleted. Similarly, the key points P2 and P3 can be deleted. For the key points P6 and P7, since the Euclidean distance between P6 and P7 is less than the second preset value, the key point P7 is deleted here. The points retained after the point deletion operation can be seen in state (b) in FIG. 7.

For example, the spray points may have the altitude information. The spray operation method of the unmanned aerial vehicle consistent with the present disclosure may also include, for the spray points on each operation route, obtaining adjacent two points according to the sequence of the spray points on the operation route.

If the two spray points include a first spray point arranged in front and a second spray point arranged behind, and the distance between the first spray point and the second spray point is less than a third preset value, the two spray points are retained, or the second spray point is deleted.

If the two spray points include a second spray point arranged in front and a first spray point arranged behind, and the distance between the first spray point and the second spray point is less than a fourth preset value, the two spray points are deleted, or the second spray point is deleted.

The first spray point is used to enable the spray operation, and the second spray point is used to disable the spray operation.

The following is the description with examples.

For two adjacent spray points, in a scenario, the front spray point A is used to enable the spray operation, the rear spray point B is used to disable the spray operation, and the distance between A and B is very close. In this case, the rear spray point B can be deleted to reduce unnecessary operation of closing the spray point. Of course, the deletion of the spray point can also be omitted.

For two adjacent spray points, in another scenario, the front spray point A is used to disable the spray operation, the rear spray point B is used to enable the spray operation, and the distance between the two spray points is very close. After the spray point B there should be a spray point C for disabling the spray operation, and before the spray point A there should be a spray point D for enabling the spray operation. Therefore, in this case, the spray points A and B can be deleted, or the spray point A can be deleted, so that the spray head is always in an open state from the spray point D to the spray point C, reducing unnecessary operation of closing the spray point.

Thus, since the spray points also have the altitude information, the operation to delete the spray points can be performed for the spray points without affecting the altitude information of the route. By deleting two adjacent spray points, unnecessary operation of opening or closing the spray point can be reduced, which is conducive to the spray operation of the unmanned aerial vehicle.

It should be noted that the present disclosure does not limit the specific value of the third preset value.

For example, the spray operation method of the unmanned aerial vehicle consistent with the present disclosure may also include, for a point set composed of the key points and the spray points on each operation route, deleting the key points between a third spray point and a fourth spray point according to the sequence of the points on the operation route if the altitude of the key points between the third spray point and the fourth spray point is less than the altitude of the third spray point. The third spray point is used to disable the spray operation, and the fourth spray point is the first spray point for enabling the spray operation after the third spray point.

Specifically, the third spray point is used to disable the spray operation, and the fourth spray point is the first spray point for enabling the spray operation afterwards. For each key point located between the third spray point and the fourth spray point, the key point can be deleted if the altitude of the key point is less than the altitude of the third spray point. Thus, when the unmanned aerial vehicle is not performing spray operations, unnecessary flight with lowered flight altitude can be avoided, which is beneficial to the spray operations of the unmanned aerial vehicle.

A spray operation method of an unmanned aerial vehicle consistent with the present disclosure also includes obtaining an image of the area to be operated, determining a spray area in the area to be operated according to the image, and determining spray points on each planned route according to the spray area and multiple planned routes, the spray points being used to enable or disable the spray operation, and the waypoints also including the spray points. According to the spray operation method of the unmanned aerial vehicle consistent with the present disclosure, on the basis that the operation route is provided with the altitude information according to three-dimensional model of the area to be operated, actual spray points on the planned route can also be determined according to the image of the area to be operated and different spray scenes. Therefore, the unmanned aerial vehicle can use the actual spray points to perform the spray operation according to actual spray scene, which further improves the spray effect and the flexibility of spray head control during the spray operation of the unmanned aerial vehicle.

Figure 8:
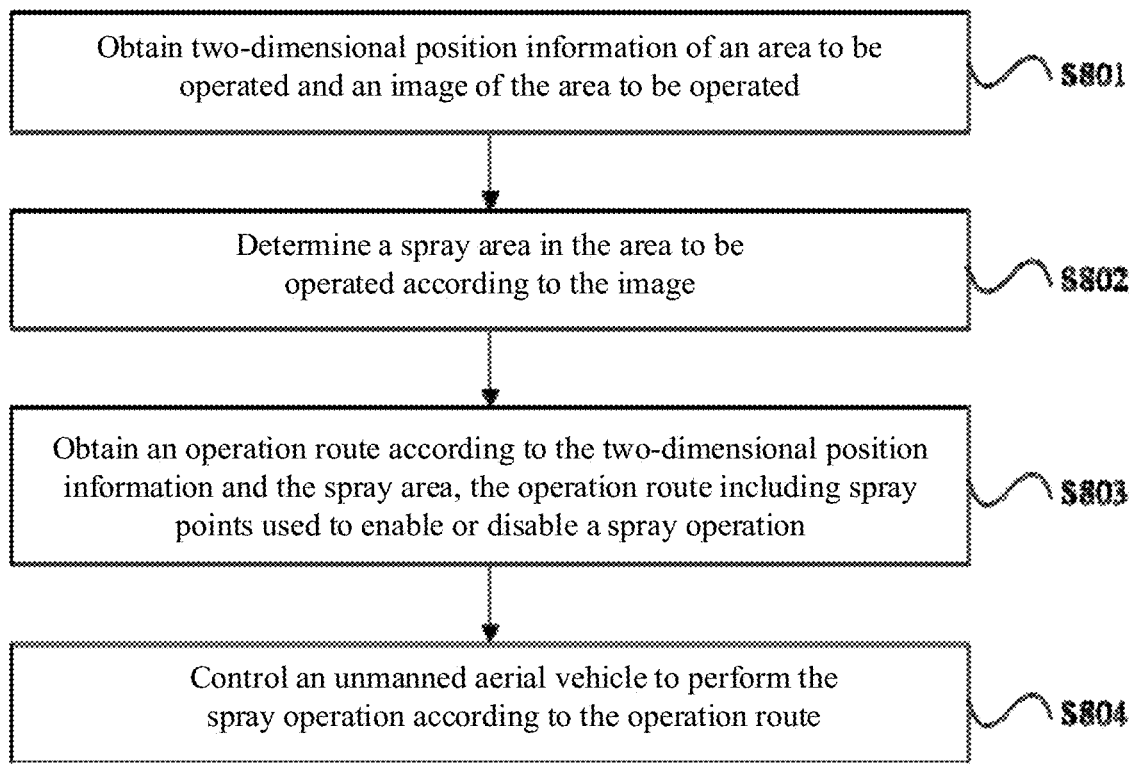
FIG. 8 is a flow chart of another example spray operation method of an unmanned aerial vehicle consistent with the present disclosure.

FIG. 8 is a flow chart of another example spray operation method of an unmanned aerial vehicle consistent with the present disclosure. In the spray operation method of the unmanned aerial vehicle consistent with the present disclosure, the execution subject may be a spray operation device of the unmanned aerial vehicle. As shown in FIG. 8, the spray operation method of the unmanned aerial vehicle consistent with the present disclosure includes the following processes.

S801, obtaining two-dimensional position information of an area to be operated and an image of the area to be operated.

S802, determining a spray area in the area to be operated according to the image.

S803, obtaining an operation route according to the two-dimensional position information and the spray area. The operation route is used by the unmanned aerial vehicle to perform a spray operation. The operation route includes spray points, which are used to enable or disable the spray operation.

S804, controlling the unmanned aerial vehicle to perform the spray operation according to the operation route.

According to the spray operation method of the unmanned aerial vehicle consistent with the present disclosure, actual spray points on a planned route can be determined according to the image of the area to be operated and different spray scenes. Therefore, the unmanned aerial vehicle can use the actual spray points to perform the spray operation according to actual spray scene, which improves the spray effect and the flexibility of spray head control during the spray operation of the unmanned aerial vehicle.

For example, obtaining the operation route according to the two-dimensional position information and the spray area includes determining multiple planned routes according to the two-dimensional position information, and obtaining the operation route according to the spray area and the multiple planned routes.

For example, obtaining the operation route according to the spray area and the multiple planned routes includes obtaining intersections of the spray area and each planned route, and obtaining the spray points on each planned route according to the intersections.

For example, obtaining the operation route also includes obtaining a three-dimensional model of the area to be operated, and determining key points on each planned route according to the multiple planned routes and the three-dimensional model. The key points have altitude information, and the operation route also includes the key points.

Specifically, on the basis that the actual spray points on the planned route can be determined according to the image of the area to be operated and different spray scenes, the operation route can also be provided with altitude information according to the three-dimensional model of the area to be operated. Thus, the unmanned aerial vehicle can perform the spray operation according to the operation route with the altitude information, increasing flight altitude where the terrain is high, and reducing flight altitude where the terrain is low, which further improves the safety performance and spray effect of the spray operation of the unmanned aerial vehicle.

For example, determining the key points on each planned route according to the multiple planned routes and the three-dimensional model includes inserting candidate points on the planned route according to a preset rule or obtaining candidate points input by a user for the planned route, and obtaining the altitude information of the candidate points according to the three-dimensional model to obtain the key points.

For example, the spray operation method of the unmanned aerial vehicle consistent with the present disclosure also includes, before obtaining the key points, obtaining two adjacent candidate points, determining a slope between the two candidate points according to the altitude information of the two candidate points, deleting one of the candidate points if the absolute value of the slope is less than a first preset value, and continuing to perform operations on two adjacent candidate points.

For example, determining the key points on each planned route according to the multiple planned routes and the three-dimensional model includes inputting the multiple planned routes and the three-dimensional model into a first neural network model to obtain the key points on each planned route.

For example, the spray points have the altitude information. The spray operation method of the unmanned aerial vehicle consistent with the present disclosure also includes, for a point set composed of the key points and the spray points on each operation route, obtaining adjacent two points according to the sequence of the points on the operation route, the two points including at least one key point.

If the Euclidean distance between the two points is less than a second preset value, any one of the key points is deleted, and the operations on two adjacent points are continued to perform.

For example, the spray points have the altitude information. The spray operation method of the unmanned aerial vehicle consistent with the present disclosure also includes, for the spray points on each operation route, obtaining adjacent two points according to the sequence of the spray points on the operation route.

If the two spray points include a first spray point arranged in front and a second spray point arranged behind, and the distance between the first spray point and the second spray point is less than a third preset value, the two spray points are retained, or the second spray point is deleted.

If the two spray points include a second spray point arranged in front and a first spray point arranged behind, and the distance between the first spray point and the second spray point is less than a fourth preset value, the two spray points are deleted, or the second spray point is deleted.

The first spray point is used to enable the spray operation, and the second spray point is used to disable the spray operation.

For example, the spray operation method of the unmanned aerial vehicle consistent with the present disclosure also includes, for a point set composed of the key points and the spray points on each operation route, deleting the key points between a third spray point and a fourth spray point according to the sequence of the points on the operation route if the altitude of the key points between the third spray point and the fourth spray point is less than the altitude of the third spray point. The third spray point is used to disable the spray operation, and the fourth spray point is the first spray point for enabling the spray operation after the third spray point.

For example, controlling the unmanned aerial vehicle to perform the spray operation according to the operation route include obtaining a preset distance value or a distance value input by a user, and controlling the unmanned aerial vehicle to perform the spray operation according to the preset distance value or the distance value input by the user, as well as the operation route, to achieve a ground-like flight.

For example, determining the spray area in the area to be operated on according to the image includes inputting the image into a second neural network model to obtain the spray area, or inputting the image into a third neural network model to obtain classification information corresponding to each unit image, and obtaining the spray area according to the classification information corresponding to each unit image.

It should be noted that the spray operation method of the unmanned aerial vehicle consistent with the present disclosure is similar to the spray operation method of the unmanned aerial vehicle consistent with the present disclosure shown in FIGS. 2-7, and execution orders of specific steps involved are different. The technical principles and technical effects are similar, and will not be repeated herein.

The spray operation method of the unmanned aerial vehicle consistent with the present disclosure includes obtaining two-dimensional position information of an area to be operated and an image of the area to be operated, determining a spray area in the area to be operated according to the image, obtaining an operation route according to the two-dimensional position information and the spray area. The operation route is used by the unmanned aerial vehicle to perform a spray operation. The operation route includes spray points, which are used to enable or disable the spray operation. According to the spray operation method of the unmanned aerial vehicle consistent with the present disclosure, actual spray points on the planned route can be determined according to the image of the area to be operated and different spray scenes. Therefore, the unmanned aerial vehicle can use the actual spray points to perform the spray operation according to actual spray scene, which improves the spray effect and the flexibility of spray head control during the spray operation of the unmanned aerial vehicle.

Figure 9:
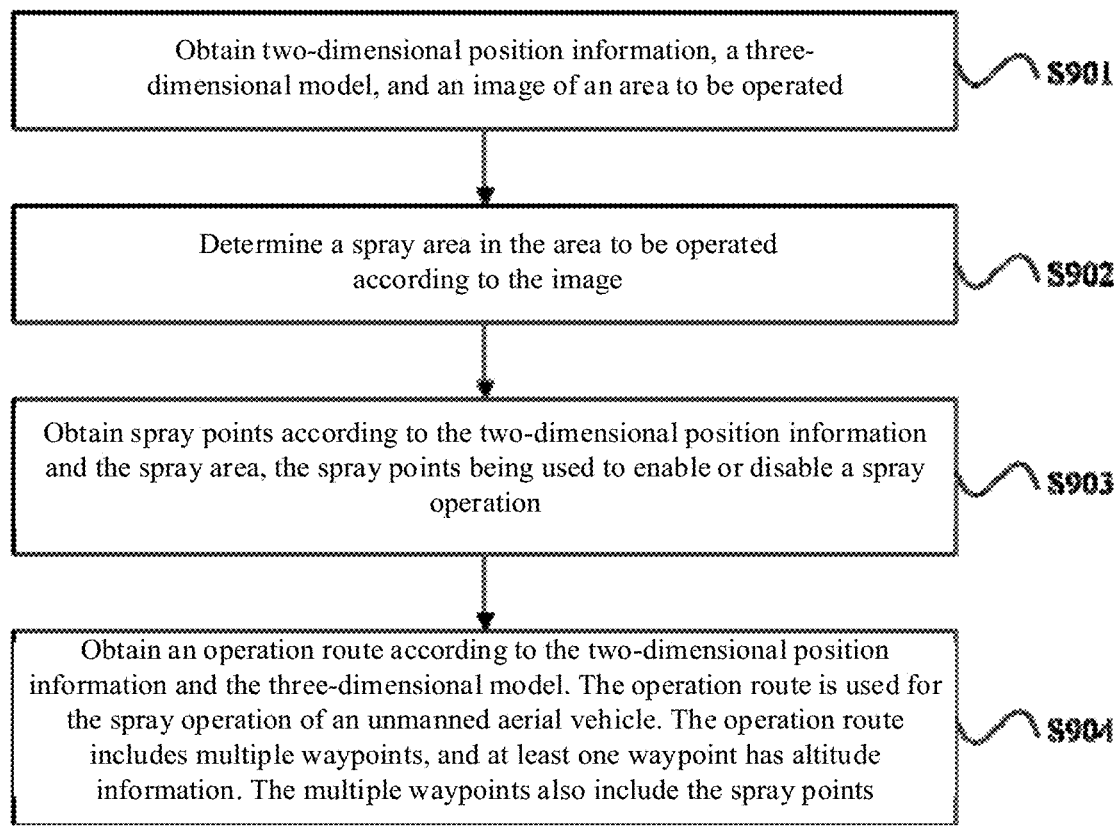
FIG. 9 is a flow chart of another example spray operation method of an unmanned aerial vehicle consistent with the present disclosure.

FIG. 9 is a flow chart of another example spray operation method of an unmanned aerial vehicle consistent with the present disclosure. In the spray operation method of the unmanned aerial vehicle consistent with the present disclosure, the execution subject may be a spray operation device of the unmanned aerial vehicle. As shown in FIG. 9, the spray operation method of the unmanned aerial vehicle consistent with the present disclosure includes the following processes.

S901, obtaining two-dimensional position information, a three-dimensional model, and an image of an area to be operated.

S902, determining a spray area in the area to be operated according to the image.

S903, obtaining spray points according to the two-dimensional position information and the spray area, the spray points being used to enable or disable a spray operation.

S904, obtaining an operation route according to the two-dimensional position information and the three-dimensional model. The operation route is used for the spray operation of the unmanned aerial vehicle. The operation route includes multiple waypoints, and at least one waypoint has altitude information. The multiple waypoints also include the spray points.

According to the spray operation method of the unmanned aerial vehicle consistent with the present disclosure, on the one hand, actual spray points on a planned route can be determined according to the image of the area to be operated and different spray scenes. Therefore, the unmanned aerial vehicle can use the actual spray points to perform the spray operation according to actual spray scene, which improves the spray effect and the flexibility of spray head control during the spray operation of the unmanned aerial vehicle. On the other hand, the operation route can also be provided with the altitude information according to the three-dimensional model of the area to be operated. Thus, the unmanned aerial vehicle can perform the spray operation according to the operation route with the altitude information, increasing flight altitude where the terrain is high, and reducing flight altitude where the terrain is low, which further improves the safety performance and spray effect of the spray operation of the unmanned aerial vehicle.

It should be noted that the present disclosure does not limit the execution order of S902 to S903 and S904. The spray operation method of the unmanned aerial vehicle consistent with the present disclosure is similar to the spray operation method of the unmanned aerial vehicle consistent with the present disclosure shown in FIGS. 2-8, and the technical principles and technical effects are similar, which will not be repeated herein.

Figure 10:
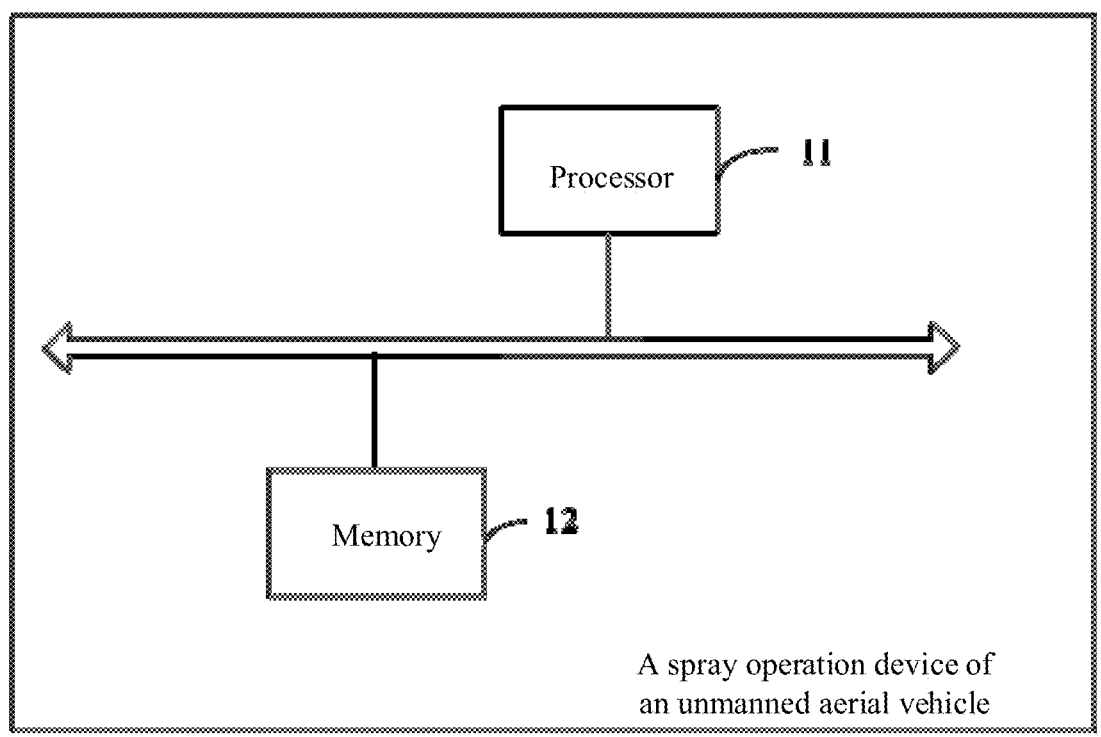
FIG. 10 is a schematic structural diagram of a spray operation device of an unmanned aerial vehicle according to an example embodiment of the present disclosure.

FIG. 10 is a schematic structural diagram of a spray operation device of an unmanned aerial vehicle according to an example embodiment of the present disclosure. As shown in FIG. 10, the spray operation device of the unmanned aerial vehicle provided by the present disclosure includes a processor 11 and a memory 12. The memory 12 is configured to store instructions. The processor 11 is configured to execute instructions stored in the memory, so that the spray operation device of the unmanned aerial vehicle executes an example spray operation method of the unmanned aerial vehicle consistent with the present disclosure shown in FIGS. 2-9. The implementation manners and technical effects are similar, and will not be repeated herein. In some embodiments, the spray operation device of the unmanned aerial vehicle may also include a transceiver, and the transceiver is configured to communicate with other devices.

One of ordinary skill in the art can understand that all or part of the processes in the method of the embodiments described above can be implemented by a program instructing relevant hardware, and the program can be stored in a computer readable storage medium. When the program is executed, the processes in the method of the embodiments are executed. The storage medium includes a read-only memory (ROM), a random access memory (RAM), a magnetic disk, an optical disk, or another medium that can store program codes.

Finally, it should be noted that the embodiments described above are only used to illustrate the technical solutions of the present disclosure rather than limiting them. Although the present disclosure has been described in detail with reference to all the described embodiments, those of ordinary skill in the art should understand that the technical solutions in all the described embodiments can still be modified, or some or all of the technical features can be equivalently replaced. The modifications or replacements do not cause the essence of the corresponding technical solutions to depart from the scope of the technical solutions in the embodiments of the present disclosure.

What is claimed is:

1. A spray operation method comprising:
obtaining two-dimensional position information of a target area and a three-dimensional model of the target area; and
obtaining an operation route according to the two-dimensional position information and the three-dimensional model, the operation route including a plurality of waypoints, and at least one of the waypoints being associated with altitude information;
wherein obtaining the operation route includes:
determining a planned route according to the two-dimensional position information; and
determining one or more key points on the planned route according to the three-dimensional model to obtain the operation route, each of the one or more key points being associated with altitude information, and the waypoints including the one or more key points; and
wherein determining the one or more key points on the planned route includes inputting the planned route and the three-dimensional model into a neural network model to obtain the one or more key points on the planned route.

2. The method of claim 1, wherein determining the one or more key points on the planned route further includes:
inserting one or more candidate points on the planned route according to a preset rule or obtaining the one or more candidate points input by a user for the planned route; and
obtaining the altitude information of the one or more candidate points according to the three-dimensional model to obtain the one or more key points.

3. The method of claim 2, further comprising, before obtaining the one or more key points:
obtaining two adjacent candidate points of the one or more candidate points;
determining a slope between the two adjacent candidate points according to the altitude information of the two adjacent candidate points; and
deleting one of the two adjacent candidate points in response to an absolute value of the slope being less than a preset value.

4. The method of claim 1, wherein:
the planned route includes one or more operation points each configured to enable or disable a spray operation; and
the one or more key points on the planned route include the one or more operation points.

5. The method of claim 4, wherein the one or more operation points include two end points of the planned route, one of the two end points being configured to enable the spray operation and another one of the two end points being configured to disable the spray operation.

6. The method of claim 1, wherein obtaining the operation route further includes:
obtaining an image of the target area;
determining a spray area in the target area according to the image; and
determining one or more spray points on the planned route according to the spray area and the planned route, each of the one or more spray points being used to enable or disable a spray operation, and the waypoints further including the one or more spray points.

7. The method of claim 6, wherein determining the spray area in the target area according to the image includes:

inputting the image into a first neural network model to obtain the spray area; or inputting the image into a second neural network model to obtain classification information corresponding to each unit image and obtaining the spray area according to the classification information corresponding to each unit image.

8. The method of claim 6, wherein determining the one or more spray points on the planned route includes:

obtaining one or more intersections of the spray area and the planned route; and obtaining the one or more spray points on the planned route according to the one or more intersections.

9. The method of claim 6, wherein:

the one or more spray points are associated with altitude information;

the method further comprising:

obtaining a point set including a plurality of points, the plurality of points including the one or more key points and the one or more spray points on the operation route;

obtaining two adjacent points from the point set according to a sequence of the points on the operation route, the two adjacent points including at least one key point of the one or more key points; and deleting any one of the at least one key point in response to a Euclidean distance between the two adjacent points being less than a preset value.

10. The method of claim 1, further comprising:

controlling an unmanned aerial vehicle to perform a spray operation according to the operation route and a distance value that is preset or input by a user, to achieve a ground-like flight.

11. A spray operation device comprising:

a memory storing instructions; and a processor configured to execute the instructions to:

obtain two-dimensional position information of a target area and a three-dimensional model of the target area; and obtain an operation route according to the two-dimensional position information and the three-dimensional model, the operation route including a plurality of waypoints, and at least one of the waypoints being associated with altitude information;

wherein the processor is further configured to execute the instructions to:

determine a planned route according to the two-dimensional position information; and determine one or more key points on the planned route according to the three-dimensional model to obtain the operation route, each of the one or more key points being associated with altitude information, and the waypoints including the one or more key points; and wherein the processor is further configured to execute the instructions to input the planned route and the three-dimensional model into a neural network model to obtain the one or more key points on the planned route.

12. The device of claim 11, wherein the processor is further configured to execute the instructions to:

insert one or more candidate points on the planned route according to a preset rule or obtain the one or more candidate points input by a user for the planned route; and obtain the altitude information of the one or more candidate points according to the three-dimensional model to obtain the one or more key points.

13. The device of claim 12, wherein the processor is further configured to execute the instructions to:

obtain two adjacent candidate points of the one or more candidate points;

determine a slope between the two adjacent candidate points according to the altitude information of the two adjacent candidate points; and delete one of the two adjacent candidate points in response to an absolute value of the slope being less than a preset value.

14. The device of claim 11, wherein:

the planned route includes one or more operation points each configured to enable or disable a spray operation; and the one or more key points on the planned route include the one or more operation points.

15. The device of claim 12, wherein the processor is further configured to execute the instructions to:

obtain an image of the target area;

determine a spray area in the target area according to the image; and determine one or more spray points on the planned route according to the spray area and the planned route, each of the one or more spray points being used to enable or disable a spray operation, and the waypoints further including the one or more spray points.

16. A spray operation device comprising:

a memory storing instructions; and a processor configured to execute the instructions to:

obtain two-dimensional position information of a target area and an image of the target area;

determine a spray area in the target area according to the image;

obtain an operation route according to the two-dimensional position information and the spray area, the operation route including one or more spray points each configured to enable or disable a spray operation; and control an unmanned aerial vehicle to perform the spray operation according to the operation route;

wherein the processor is further configured to execute the instructions to:

determine a planned route according to the two-dimensional position information; and determine one or more key points on the planned route according to the three-dimensional model to obtain the operation route, each of the one or more key points being associated with altitude information, and the waypoints including the one or more key points; and wherein the processor is further configured to execute the instructions to input the planned route and the three-dimensional model into a neural network model to obtain the one or more key points on the planned route.

* * * * *